United States Patent Office

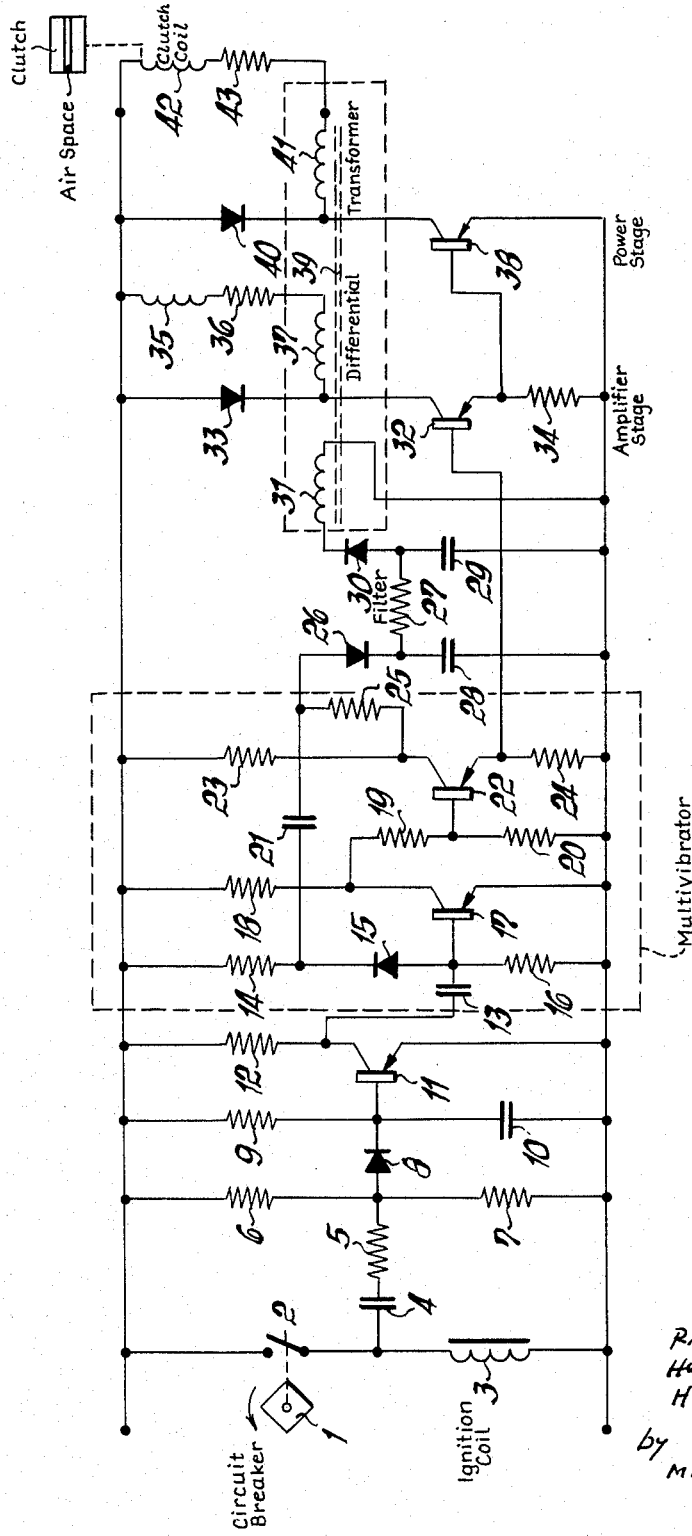

3,258,094
Patented June 28, 1966

3,258,094
ELECTROMAGNETIC CLUTCH CONTROL SYSTEM
Richard Zechnall, Stuttgart, Heinrich Spittler, Hohenacker, and Hermann Scholl, Stuttgart, Germany, assignors to Robert Bosch G.m.b.H., Stuttgart, Germany
Filed Dec. 18, 1964, Ser. No. 419,295
Claims priority, application Germany, Dec. 19, 1963, B 74,818
11 Claims. (Cl. 192—84)

The present invention relates to an electromagnetic cltuch control system. More particularly, the invention relates to an electromagnetic clutch control system for providing a variable speed current supply to the electromagnetic clutch coil of a motor vehicle.

A disadvantage of electromagnetic clutches is that their characteristic changes on account of the wear of the friction linings whereby the air gap is reduced. With decreasing air gap and the same magnetizing current the torque transmitted by the clutch increases.

The use of such clutches in a motor vehicle as starting and gear-changing clutches presents difficulties insofar as there must be, especially for automatically controlled starting, a certain relation between the engine speed and the torque transmitted by the clutch. If the clutch torque is too high at a certain engine speed, the engine will stall during the starting with the accelerator pedal fully depressed. The wear of the friction linings will cause in comparatively short periods the necessity to adjust either the air gap of the clutch or the electronic starting control system.

The principal object of the present invention is to provide a new and improved electromagnetic clutch control system.

In accordance with the present invention, the electromagnetic clutch control system comprises an electromagnetically operated clutch having an air space. A clutch coil operates the clutch and varies in inductance in accordance with variation of the air space of the clutch. A multivibrator circuit produces output pulses for energizing the clutch coil and includes a timer for determining and varying the duration of the output pulses. The multivibrator circuit is energized to produce the output pulses and the output pulses are supplied to the clutch coil. The clutch coil is coupled to the timer of the multivibrator to vary the duration of the output pulses produced by the multivibrator in accordance with variation of the inductance of the clutch coil in a manner whereby a variation of the air space of the clutch is counteracted.

In a preferred embodiment of the invention, the clutch coil is coupled to the timer of the multivibrator by a first resistance-inductance time constant circuit including the clutch coil having a first time constant dependent upon the inductance of the clutch coil. A second resistance-inductance time constant circuit has a determined second time constant. A differential transformer compares the first and second time constants and produces a difference voltage having a characteristic dependent upon the difference of the first and second time constants and has a first winding connected to the first time constant circuit, a second winding connected to the second time constant circuit and a third winding magnetically coupled to the first and second windings for producing the difference voltage in accordance with magnetic imbalance between the first and second windings. A filter shapes the differential voltage and supplies it to the timer of the multivibrator circuit.

In order that the present invention may be readily carried into effect, it will now be described with reference to the accompanying drawing, wherein the single figure is a circuit diagram of an embodiment of the electromagnetic clutch control system of the present invention.

In the figure, a multivibrator 14 to 25 comprises two transistors 17 and 22 which are switched to their conductive condition alternately. The collector electrode of the transistor 17 is connected to the base electrode of the transistor 22 via a resistor 19 and the collector electrode of the transistor 22 is coupled to the base electrode of the transistor 17 via a resistor 25, a capacitor 21 and a diode rectifier 15. The capacitor 21 of the multivibrator functions as a timer to control the duration of the output pulses produced by the multivibrator.

The output pulses produced by the multivibrator have a duration of a few milliseconds and are supplied from the emitter electrode of the transistor 22 to a power transistor 38 via an amplifier transistor 32. The power transistor 38 regulates the flow of current supplied to a clutch coil 42 for operating an electromagnetic clutch having an air space. When the multivibrator is in operation, the power transistor 38 is in its conductive condition.

A circuit breaker of interrupter 1, 2 is connected in series with an ignition coil 3 across the positive and negative terminals of a source of D.C. voltage of the type utilized in motor vehicle ignition systems. The circuit breaker 1, 2 causes the ignition coil 3 to produce pulses which are fed through an input stage 4 to 13 to the input of the multivibrator, which is the base electrode of the transistor 17. The input circuit 1 to 13 thus energizes the multivibrator 14 to 25 to produce output pulses at the emitter electrode of the transistor 22.

At lower speeds, there is a linear relation between the revolutions of the motor and the mean current of the clutch coil. The duration of the pulses produced by the multivibrator determines the rate of current increase in the clutch coil in relation to the number of revolutions of the motor. The duration of the pulses produced by the multivibrator also affects the operating characteristics of the circuit and the starting characteristics of the motor.

The input circuit 4 to 13 shapes the pulses produced by its components 1 to 3 to a shape suitable to operate the multivibrator 14 to 25. The multivibrator functions in the usual manner with the transistor 17 in its conductive condition and the transistor 22 in its non-conductive condition and alternately with the transistor 22 in its conductive condition and the transistor 17 in its non-conductive condition. The amplifier transistor 32 and the power transistor 38 are in their conductive condition during the operation of the multivibrator circuit 14 to 25.

The resistance of the clutch coil 42 is indicated as a resistor 43. During operation of the multivibrator, the current in the clutch coil 42 increases in an exponential manner. When the multivibrator is inoperative, the transistors 32 and 38 are switched to their non-conductive condition. When the transistors 32 and 38 are non-conductive, the current in the clutch coil 42 decreases and is conducted through a diode rectifier 40.

A differential transformer comprises a core 39, a first winding 41, a second winding 37 and a third winding 31. The first, second and third windings 41, 37 and 31 are all magnetically coupled to each other. The clutch coil 42 is connected at one end in series with the first winding 41 of the differential transformer. The second winding 37 of the differential transformer is connected at one end to a common connection point between the amplifier transistor 32 and a diode rectifier 33 and at its other end to a series connection of a resistor 36 and an inductor 35. The first winding 41 of the differential transformer is connected at one end to a common connection point between the power transistor 38 and the diode rectifier 40 and at its other end to the clutch coil 42 and its resistance 43.

The resistance value of the resistor 36 adjusts to the requirements of the current output of the power transistor 38. The clutch coil 42 and its resistance 43 comprise a first time constant circuit having a first time constant dependent upon the inductance of said clutch coil. The inductor 35 and the resistor 36 comprise a second time constant circuit having a second determined time constant. The inductance of the inductor 35 is adjusted in such a manner that the first time constant of the first time constant circuit 42, 43 is the same as the second time constant of the second time constant circuit 35, 36 when the maximum air space is present in the clutch. That is, the first and second time constants are equal when there is no dust or foreign material in the air space of the clutch so that said air space is a maximum.

The ratio of the number of turns in the first and second windings 41 and 37 of the differential transformer corresponds to the ratio of current flow. Despite the directions of the turns of the windings 37 and 41, the magnetic fields created by current flowing through said windings will cancel each other out as long as the air space of the clutch is a maximum.

When the air space of the clutch decreases due to the presence of dust particles or the like, the inductance of the clutch coil 42 increases. This increases the first time constant of the first time constant circuit 42, 43 and said first time constant becomes larger than the second time constant of the second time constant circuit 35, 36. The magnetic fields produced by the first and second windings 41 and 37 of the differential transformer become unbalanced and fail to cancel each other out.

Unbalance of the magnetic fields produced by the first and second windings 41 and 37 induces a voltage in the third winding 31 of the differential transformer. The third winding 31 of the differential transformer thus produces pulses which are rectified by a diode rectifier 30 and fed to a filter 27, 28, 29. The filter 27, 28, 29 shapes the pulses by eliminating or reducing ripples and thereby flattening them. The pulses supplied by the filter 27, 28, 29 appear as a regulated negative voltage across the capacitor 28 of said filter, which voltage increases in magnitude with a corresponding reduction of the air space of the clutch.

The negative voltage across the capacitor 28 of the filter 27, 28, 29 is applied to the timer capacitor 21 of the multivibrator 14 to 25 via a diode rectifier 26 and thereby controls the duration of the output pulses produced by said multivibrator.

When the air space of the electromagnetic clutch is a maximum, the control voltage appearing across the capacitor 28 and applied to the capacitor 21 is zero and the duration of the output pulses produced by the multivibrator is a maximum. Correspondingly, the mean value of the current flowing through the clutch coil 42 in accordance with the corresponding determined speed of the motor is a maximum.

When the air space of the clutch is decreased, the duration of the output pulses produced by the multivibrator is decreased due to an increase in the voltage across the capacitor 28 and the application of the voltage across the capacitor 28 to the capacitor 21; the diode 26 then limiting the discharge at the junction point between the capacitor 21 and the resistor 25 of the multivibrator. The reduction in the duration of the output pulses produced by the multivibrator decreases the mean current flowing through the clutch coil and thereby decreases the speed of the motor.

The current flowing through the clutch coil 42 counteracts the tendency of the motor to increase its speed due to the decrease of the air space of the clutch. Due to adjustment of the third winding 31 of the differential transformer, the control voltage across the capacitor 28 increases in direct relation with the decrease of the air space. The speed transmitted by the clutch is thus maintained at a desired magnitude regardless of variations of the air space of the clutch.

While the invention has been described by means of a specific example and in a specific embodiment, we do not wish to be limited thereto, for obvious modifications will occur to those skilled in the art without departing from the spirit and scope of the invention.

What we claim is:

1. An electromagnetic clutch control system, comprising an electromagnetically operated clutch having an air space; a clutch coil for operating said clutch, said clutch coil varying in inductance in accordance with variation of the air space of said clutch; a pulse circuit for producing output pulses for energizing said clutch coil, said pulse circuit having an input, an output and timing means for determining and varying the duration of said output pulses; energizing means connected to the input of said pulse circuit for energizing said pulse circuit to produce said output pulses; output means coupling the output of said pulse circuit to said clutch coil for supplying the output pulses produced by said pulse circuit to said clutch coil; and coupling means coupling said clutch coil to the timing means of said pulse circuit in accordance with variation of the inductance of said clutch coil in a manner whereby a variation of the air space of said clutch is counteracted.

2. An electromagnetic clutch control system, comprising an electromagnetically operated clutch having an air space; a clutch coil for operating said clutch, said clutch coil varying in inductance in accordance with variation of the air space of said clutch; a multivibrator circuit for producing output pulses for energizing said clutch coil, said multivibrator circuit having an input, an output and timing means for determining and varying the duration of said output pulses; energizing means connected to the input of said multivibrator circuit for energizing said multivibrator circuit to produce said output pulses; output means coupling the output of said multivibrator circuit to said clutch coil for supplying the output pulses produced by said multivibrator circuit to said clutch coil; and coupling means coupling said clutch coil to the timing means of said multivibrator circuit in accordance with variation of the inductance of said clutch coil in a manner whereby a variation of the air space of said clutch is counteracted.

3. An electromagnetic clutch control system, comprising an electromagnetically operated clutch having an air space; a clutch coil for operating said clutch, said clutch coil varying in inductance in accordance with variation of the air space of said clutch; a multivibrator circuit for producing output pulses for energizing said clutch coil, said multivibrator circuit having an input, an output and timing means for determining and varying the duration of said output pulses; energizing means connected to the input of said multivibrator circuit for energizing said multivibrator circuit to produce said output pulses; output means coupling the output of said multivibrator circuit to said clutch coil for supplying the output pulses produced by said multivibrator circuit to said clutch coil; and coupling means coupling said clutch coil to the timing means of said multivibrator circuit in accordance with variation of inductance of said clutch coil in a manner whereby a variation of the air space of said clutch is counteracted, said coupling means including a first time constant circuit including said clutch coil having a first time constant dependent upon the inductance of said clutch coil, a second time constant circuit having a determined second time constant, and differentiating means for comparing the time constants of said first and second time constant circuits and for producing a difference voltage having a characteristic dependent upon the difference of said first and second time constants.

4. An electromagnetic clutch control system, comprising an electromagnetically operated clutch having an air space; a clutch coil for operating said clutch, said clutch coil varying in inductance in accordane with variation of the air space of said clutch; a multivibrator circuit for producing output pulses for energizing said clutch coil, said multivibrator circuit having an input, an output and timing means for determining and varying the duration of said output pulses; energizing means connected to the input of said multivibrator circuit for energizing said multivibrator circuit to produce said output pulses; output means coupling the output of said multivibrator circuit to said clutch coil for supplying the output pulses produced by said multivibrator circuit to said clutch coil; and coupling means coupling said clutch coil to the timing means of said multivibrator circuit in accordance with variation of the inductance of said clutch coil in a manner whereby a variation of the air space of said clutch is counteracted, said coupling means including a first resistance-inductance time constant circuit including said clutch coil having a first time constant dependent upon the inductance of said clutch coil, a second resistance-inductance time constant circuit having a determined second time constant; and a differential transformer for comparing the first and second time constants and for producing a difference voltage having a characteristic dependent upon the difference of said first and second time constants, said differential transformer having a first winding connected to said first time constant circuit, a second winding connected to said second time constant circuit and a third winding magnetically coupled to said first resistance-inductance time constant circuit including voltage in accordance with magnetic imbalance between said first and second windings.

5. An electromagnetic clutch control system, comprising, an electromagnetically operated clutch having an air space; a clutch coil for operating said clutch, said clutch coil varying in inductance in accordance with variation of the air space of said clutch; a multivibrator circuit for producing output pulses for energizing said clutch coil, said multivibrator circuit having an input, an output and timing means for determining and varying the duration of said output pulses; energizing means connected to the input of said multivibrator circuit for energizing said multivibrator circuit to produce said output pulses; output means coupling the output of said multivibrator circuit to said clutch coil for supplying the output pulses produced by said multivibrator circuit to said clutch coil; and coupling means coupling said clutch coil to the timing means of said multivibrator circuit in accordance with variation of the inductance of said clutch coil in a manner whereby a variation of the air space of said clutch is counteracted, said coupling means including a first resistance-inductance time constant circuit including said clutch coil having a first time constant dependent upon the inductance of said clutch coil, a second resistance-inductance time constant circuit having a determined second time constant, a differential transformer for comparing the first and second time constants and for producing a difference voltage having a characteristic dependent upon the difference of said first and second time constants, said differential transformer having a first winding connected to said first time constant circuit, a second winding connected to said second time constant circuit and a third winding magnetically coupled to said first and second windings for producing said difference voltage in accordance with magnetic imbalance between said first and second windings; filter means having an input connected to the third winding of said differential transformer for shaping said difference voltage and an output, and connecting means connecting the output of said filter means to the timing means of said multivibrator circuit for supplying the shaped difference voltage provided by said filter means to said multivibrator circuit.

6. An electromagnetic clutch control system comprising an electromagnetically operated clutch having an air space; a clutch coil for operating said clutch, said clutch coil varying in inductance in accordance with variation of the air space of said clutch; a multivibrator circuit for producing output pulses for energizing said clutch coil, said multivibrator circuit comprising first and second transistors each having an emitter electrode, a base electrode and a collector electrode, connecting means interconnecting said first and second transistors for alternate operation thereof, an input coupled to the base electrode of said first transistor, an output connected to the emitter electrode of said second transistor and timing means for determining and varying the duration of said output pulses, said timing means comprising a timing capacitor connected between the collector electrode of said second transistor and the base electrode of said first transistor; energizing means connected to the input of said multivibrator circuit for energizing said multivibrator circuit to produce said output pulses; output means coupling the output of said multivibrator circuit to said clutch coil for supplying the output pulses produced by said multivibrator circuit to said clutch coil; and coupling means coupling said clutch coil to the timing means of said multivibrator circuit in accordance with variation of the inductance of said clutch coil in a manner whereby a variation of the air space of said clutch is counteracted.

7. An electromagnetic clutch control system, comprising an electromagnetically operated clutch having an air space; a clutch coil for operating said clutch, said clutch coil varying in inductance in accordance with variation of the air space of said clutch; a multivibrator circuit for producing output pulses for energizing said clutch coil, said multivibrator circuit comprising first and second transistors each having an emitter electrode, a base electrode and a collector electrode, connecting means interconnecting said first and second transistors for alternate operation thereof, an input coupled to the base electrode of said first transistor, an output connected to the emitter electrode of said second transistor and timing means for determining and varying the duration of said output pulses, said timing means comprising a timing capacitor connected between the collector electrode of said second transistor and the base electrode of said first transistor; energizing means connected to the input of said multivibrator circuit for energizing said multivibrator circuit to produce said output pulses; output means coupling the output of said multivibrator circuit of said clutch coil for supplying the output pulses produced by said multivibrator circuit to said clutch coil; and said multivibrator circuit in accordance with variation of the inductance of said clutch coil in a manner whereby an air space of said clutch is counteracted, said coupling means including a first resistance-inductance time constant circuit including said clutch coil having a first time constant dependent upon the inductance of said clutch coil, a second resistance-inductance time constant circuit having a determined second time constant, a differential transformer for comparing the first and second time constants and for producing a difference voltage having a characteristic dependent upon the difference of said first and second time constants, said differential transformer having a first winding connected to said first time constant circuit, a second winding connected to said second time constant circuit and a third winding magnetically coupled to said first and second windings for producing said difference voltage in accordance with magnetic imbalance between said first and second windings, filter means having an input connected to the third winding of said differential transformer for shaping said difference voltage and an output, and connecting means connecting the output of said filter means to the timing means of said multivibrator circuit for supplying the shaped difference voltage provided by said filter means to said multivibrator circuit.

8. An electromagnetic clutch control system as claimed in claim 7, wherein said output means comprises an amplifier transistor connected to the emitter electrode of said second transistor of said multivibrator circuit and a power transistor connected between said amplifier transistor and the first winding of said differential transformer, and wherein the shaped difference voltage provided by said filter circuit is supplied to a common connection point between the timing capacitor of said multivibrator circuit and the collector electrode of said second transistor of said multivibrator.

9. An electromagnetic clutch control system as claimed in claim 7, wherein said coupling means further comprises a first coupling diode connected between the third winding of said differential transformer and the input of said filter means and a second coupling diode connected between the output of said filter means and a common connection point between the timing capacitor of said multivibrator circuit and the collector electrode of said second transistor of said multivibrator, and wherein said output means comprises an amplifier transistor having emitter, collector and base electrodes connected to the emitter electrode of said second transistor of said multivibrator circuit and a power transistor having emitter, collector and base electrodes connected between said amplifier transistor and the first winding of said differential transformer.

10. An electromagnetic clutch control system as claimed in claim 9, further comprising a current supply line, and wherein said filter means comprises a pair of capacitors in Pi connection with a resistor, one of said capacitors being connected between said first coupling diode and said current supply line and the other of said capacitors being connected between said second coupling capacitor and said current supply line, the resistor of said filter means being connected between a common connection point of one of the capacitors thereof and said first coupling diode and a common connection point of the other of the capacitors thereof and said second coupling diode.

11. An electromagnetic clutch control system as claimed in claim 9, further comprising a first discharge diode connected across the series connection of the first winding of said differential transformer and the first time constant circuit and a second discharge diode connected across the series connection of the second winding of said differential transformer and the second time constant circuit, said first winding of said differential transformer being connected in series with said first time constant circuit and said second winding of said differential transformer being connected in series with said second time constant circuit, and wherein the collector electrode of said power transistor is connected to a common connection point of said first discharge diode and said first winding of said differential transformer, the collector electrode of said amplifier transistor is connected to a common connection point of said second discharge diode and said second winding of said differential transformer, and the emitter electrode of said amplifier transistor is connected to the base electrode of said power transformer.

References Cited by the Examiner

UNITED STATES PATENTS

| | | | |
|---|---|---|---|
| 2,806,157 | 9/1957 | Dustman | 310—94 |
| 3,008,092 | 11/1961 | Cawthra | 330—79 |
| 3,073,422 | 1/1963 | Baumann | 192 |
| 3,163,272 | 12/1964 | Baumann | 192—84 |

STEPHEN W. CAPELLI, *Primary Examiner.*

SAMUEL BERNSTEIN, *Examiner.*

D. YUSKO, *Assistant Examiner.*